(12) United States Patent
Kim

(10) Patent No.: US 7,714,925 B2
(45) Date of Patent: May 11, 2010

(54) METHOD OF MARKING DESIRED IMAGES IN A DIGITAL IMAGE PROCESSING APPARATUS USING A GO TO FUNCTION

(75) Inventor: Ji-hong Kim, Seongnam-si (KR)

(73) Assignee: Samsung Digital Imaging Co., Ltd., Suwon-si (KR)

(*) Notice: Subject to any disclaimer, the term of this patent is extended or adjusted under 35 U.S.C. 154(b) by 1266 days.

(21) Appl. No.: 11/233,249

(22) Filed: Sep. 22, 2005

(65) Prior Publication Data
US 2006/0284994 A1  Dec. 21, 2006

(30) Foreign Application Priority Data
Jun. 15, 2005  (KR) .................... 10-2005-0051260

(51) Int. Cl.
H04N 5/222 (2006.01)
H04N 5/76 (2006.01)
(52) U.S. Cl. .............. 348/333.05; 348/231.2; 348/231.3; 348/333.02; 348/333.11
(58) Field of Classification Search .............. None
See application file for complete search history.

(56) References Cited

U.S. PATENT DOCUMENTS

| 7,196,727 B2* | 3/2007 | Sato ............... 348/333.11 |
| 7,471,890 B2* | 12/2008 | Lee et al. ............ 396/287 |
| 7,480,002 B2* | 1/2009 | Goh et al. .......... 348/333.05 |
| 2001/0015762 A1* | 8/2001 | Suzuki et al. ....... 348/333.05 |
| 2002/0064387 A1* | 5/2002 | Miyake et al. ........ 396/429 |
| 2003/0063131 A1* | 4/2003 | Ma ................... 345/838 |
| 2003/0086012 A1* | 5/2003 | Stavely et al. ...... 348/333.05 |
| 2003/0133032 A1* | 7/2003 | Aoki et al. ......... 348/333.05 |
| 2004/0119876 A1 | 6/2004 | Ohmori et al. |
| 2004/0190055 A1* | 9/2004 | Takamatsu et al. ..... 358/1.15 |
| 2006/0007317 A1* | 1/2006 | Lin ................. 348/211.3 |

FOREIGN PATENT DOCUMENTS

CN  1496103 A  5/2004

\* cited by examiner

Primary Examiner—Ngoc-Yen T Vu
(74) Attorney, Agent, or Firm—Drinker Biddle & Reath LLP

(57) ABSTRACT

Provided is a method of controlling a digital image processing apparatus which sequentially stores images in a recording medium after capturing the images in a photographing mode and sequentially displays the images stored in the recording medium by receiving direction signals input by a user in a play mode. A go to setting is set regarding the captured images according to a selection of the user in the photographing mode. A list of images that are set with the go to setting is displayed according to the selection of the user in the play mode and then the image selected by the user from the list is displayed.

21 Claims, 11 Drawing Sheets

METHOD OF MARKING DESIRED IMAGES IN A DIGITAL IMAGE PROCESSING APPARATUS USING A GO TO FUNCTION

CROSS-REFERENCE TO RELATED PATENT APPLICATIONS

This application claims the priority of Korean Patent Application No. 10-2005-0051260, filed on Jun. 15, 2005 in the Korean Intellectual Property Office, the disclosure of which is incorporated herein in its entirety by reference.

BACKGROUND OF THE INVENTION

1. Field of the Invention

The present invention relates generally to a method of controlling a digital image processing apparatus, and more particularly, to a method and apparatus for marking captured images to facilitate retrieval thereof.

2. Description of the Related Art

A conventional image forming apparatus, for example, the digital camera disclosed in U.S. Patent Publication No. 2004119876 entitled "Method of Notification of Inadequate Picture Quality" sequentially stores images in a recording medium after capturing the images in a photographing mode, and sequentially displays the images stored in the recording medium according to direction signals received from a user interface in a play mode.

Images captured during the photographing mode are stored in the recording medium in the capturing order. When the play mode starts, the image of the most recently stored file is displayed. Thereafter, the images are displayed in the reverse order to the order in which they were stored as left direction signals are input by a user, and the images are displayed in the order in which they are stored as right direction signals are input by the user.

According to a method of controlling a digital image processing apparatus as the one described above, a user needs to generate numerous direction signals to find a desired image in the play mode.

SUMMARY OF THE INVENTION

The present invention provides a method of controlling a digital image processing apparatus that can conveniently and quickly search an image that a user desires in a play mode.

According to an aspect of the present invention, there is provided a method of controlling a digital image processing apparatus in which a setting or mode for marking captured images (hereinafter referred to as a go to function, setting or mode) facilitates retrieval and display of images thereby marked. In the play mode, list of images (e.g., thumbnail-sized images), each of which being previously marked via the go to setting, is displayed according to a selection of the user in the play mode and the image selected by the user from the list is displayed.

According to the method, an image selected by the user among the images that are set with the go to setting can be immediately displayed. Accordingly, the user can quickly and easily find a desired image using the images that are set in the go to setting.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown.

Figure 1:
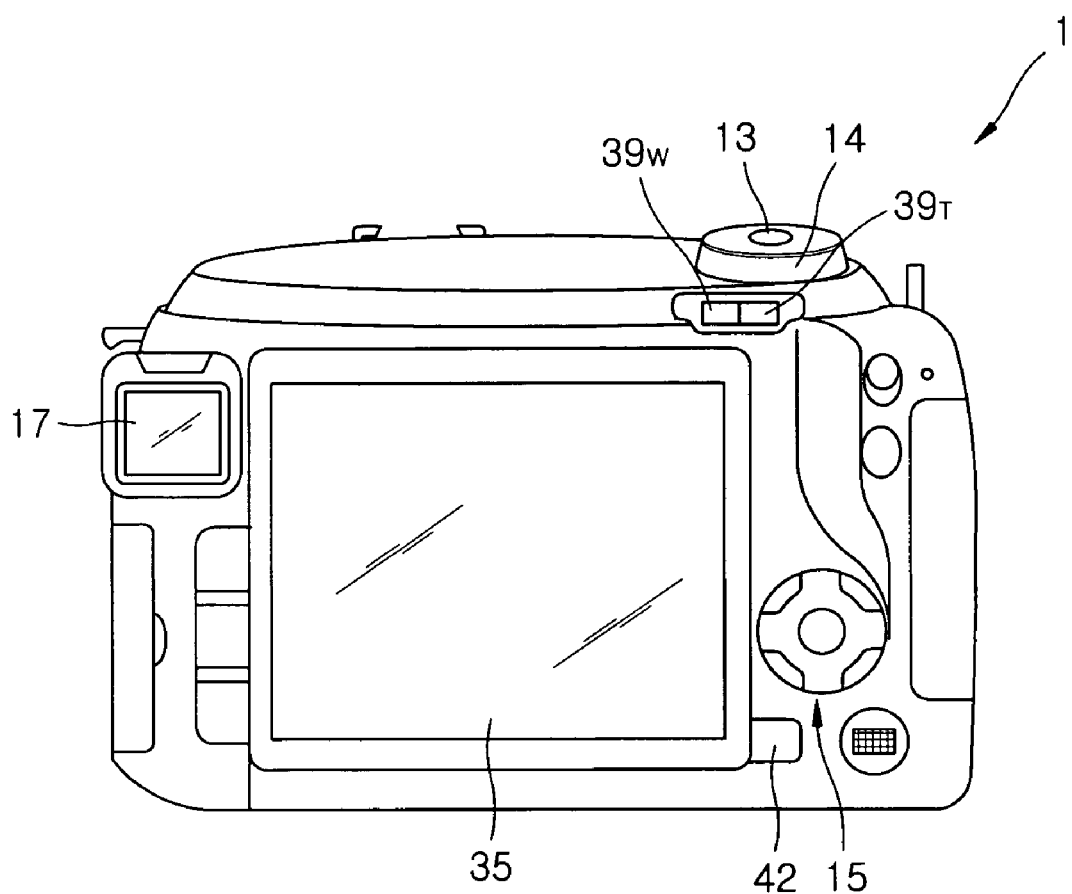
FIG. 1 is an exterior view of an exemplary digital camera, which is an example of a digital image processing apparatus, according to an embodiment of the present invention.

Referring to FIG. 1, a digital camera 1, which is an example of a digital image processing apparatus according to an embodiment of the present invention, includes a shutter release button 13, a mode dial 14, a wide-angle zoom button $39_W$, a telephoto zoom button $39_T$, an electronic view-finder 17, a color liquid crystal display (LCD) panel 35, function buttons 15, and a play mode button 42.

The mode dial 14 is used by a user to select various operating modes, for example, a simple image photographing mode, a program photographing mode, a portrait photographing mode, a night scene photographing mode, a manual photographing mode, and a moving picture photographing mode.

The function buttons 15 are used to perform specific functions of the digital camera 1 as well as direction-movement buttons to move an activated cursor on a menu screen of the color LCD panel 35. For example, the function buttons 15 may include a self-timer/right button, a flash/left button, a macro/down button, an audio-memo/up button, and a menu/select-confirm button.

The play mode button 42 is used to convert to or from a preview mode.

Figure 2:
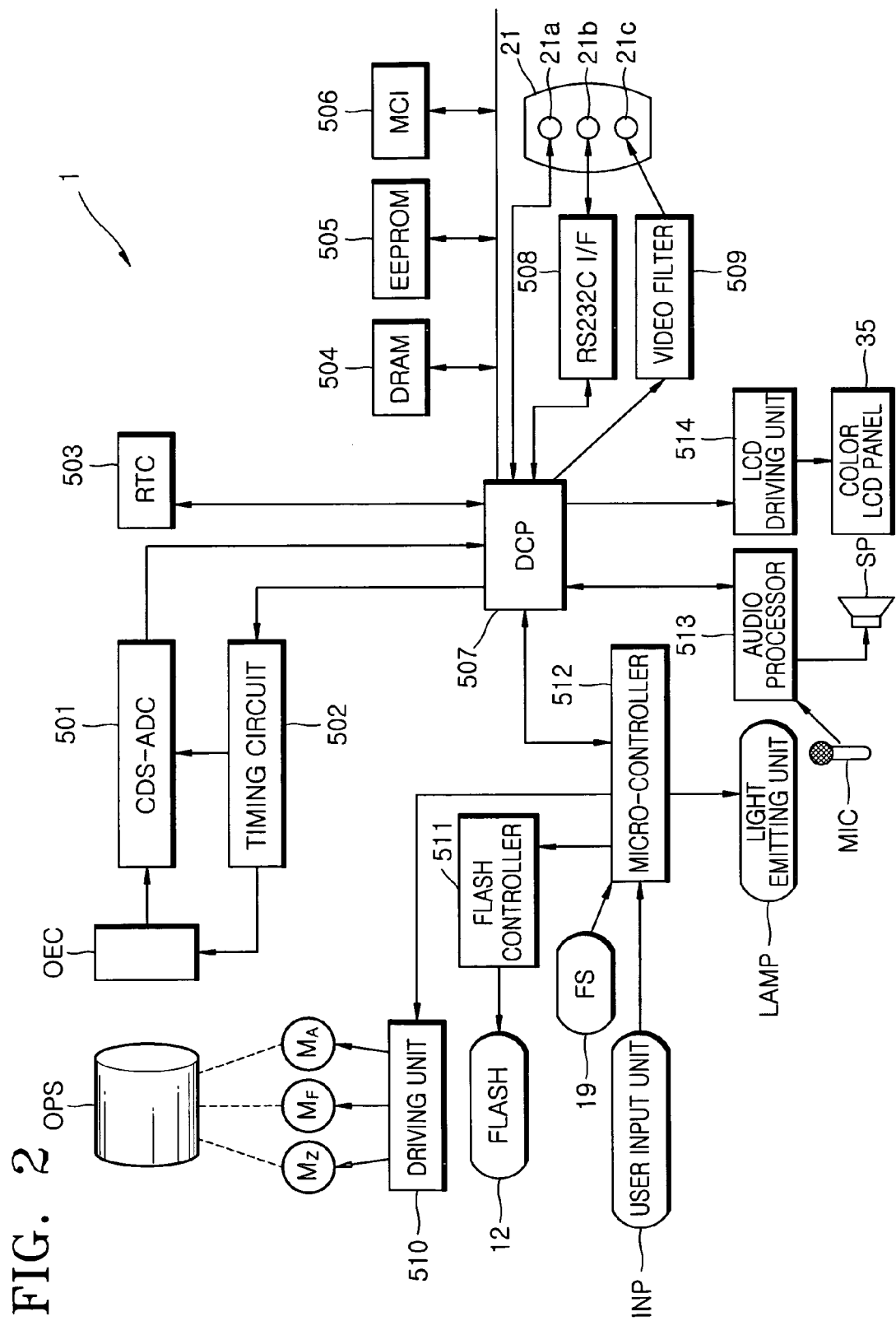
FIG. 2 is a block diagram illustrating an exemplary structure of the digital camera illustrated in FIG. 1.

FIG. 2 is a block diagram illustrating a structure of the exemplary digital camera 1 illustrated in FIG. 1. Referring to FIGS. 1 and 2, the structure and operations of the digital camera 1 will be described.

An optical system OPS, which includes a lens unit (not shown) and a filter unit (not shown), optically processes light reflected from a subject.

The lens unit of the optical system OPS includes a zoom lens (not shown), a focus lens (not shown), and a compensation lens (not shown).

When a user presses the wide-angle zoom button $39_W$ or the telephoto zoom button $39_T$ included in a user input unit INP, a signal corresponding to the wide-angle zoom button $39_W$ or the telephoto zoom button $39_T$ is input to a micro-controller 512. Accordingly, as the micro-controller 512 controls a driving unit 510, a zoom motor $M_Z$ operates, thereby moving the zoom lens.

In the automatic focusing mode, a main controller (not shown) embedded in a digital camera processor (DCP) 507 controls the driving unit 510 via the micro-controller 512, thereby driving a focus motor $M_F$. Accordingly, the focus lens moves from a minimum position to a maximum position, and in this process, a number of steps for locating the focus lens (e.g., a number of location steps of the focus motor $M_F$) are set at which an amount of high frequency in an image signal is increased the most.

A motor $M_A$ drives an aperture (not shown).

A photoelectric converter OEC of a charge-coupled device (CCD) or a complementary metal oxide semiconductor (CMOS) (not shown) converts light from the optical system OPS into an electrical analog signal. Here, the DCP 507 controls a timing circuit 502 and controls the operation of the photoelectric converter OEC and a correlation double sampler and analog-to-digital converter (CDS-ADC) 501. The CDS-ADC 501 processes the analog signal output from the photoelectric converter OEC, and converts it into a digital signal after removing high frequency noise from the analog signal and altering the bandwidth of the analog signal.

A real-time clock (RTC) 503 provides time information to the DCP 507. The DCP 507 processes the digital signal output from the CDS-ADC device 501, and generates a digital image signal divided into a chrominance signal and a luminance signal.

A light emitting unit LAMP that is operated by the micro-controller 512 according to control signals output from the DCP 507 includes indicating lamps. The user input unit INP includes the shutter button 13, the mode dial 14, the wide-angle zoom button $39_W$, the telephoto zoom button $39_T$, the function buttons 15, and the play mode button 42.

The digital image signal output from the DCP 507 is temporarily stored in a dynamic random access memory (DRAM) 504. Algorithms needed for the operation of the DCP 507 as the controller and for setting data are stored in an electrically erasable and programmable read-only memory (EEPROM) 505. A memory card, which is a user's recording medium, is detachably inserted into a memory card interface (MCI) 506.

The digital image signal output from the DCP 507 is input to an LCD driving unit 514. As a result, an image is displayed on the color LCD panel 35.

The digital image signal output from the DCP 507 can be transmitted in a series communication via a universal serial bus (USB) connector 21a or an RS232C interface 508 and its connector 21b, or can be transmitted as a video signal via a video filter 509 and a video output unit 21c.

An audio processor 513 outputs an audio signal from a microphone MIC to the DCP 507 or a speaker SP, and outputs an audio signal from the DCP 507 to the speaker SP.

The micro-controller 512 controls the operation of a flash controller 511 according to a signal output by a flash sensor (FS) 19, and thus operates the flash 12.

Figure 3:
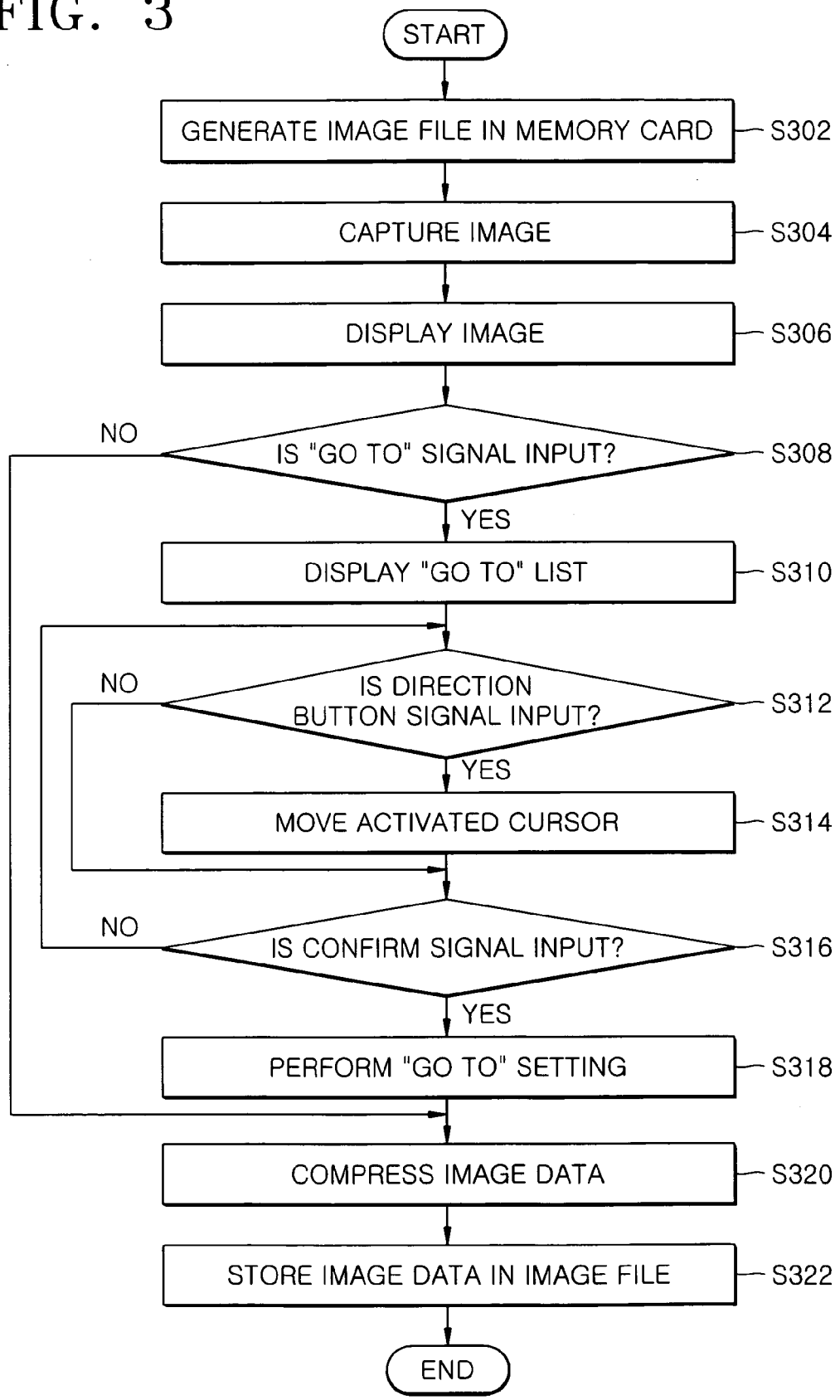
FIG. 3 is a flow chart illustrating an algorithm performed in a photographing mode of a digital camera processor (DCP) illustrated in FIG. 2.

FIG. 3 is a flow chart illustrating an algorithm performed in a photographing mode of the DCP 507 illustrated in FIG. 2. Referring to FIGS. 1 through 3, the operation performed in the photographing mode when the user presses the shutter release button 13 will be described.

First, the DCP 507 generates and stores an image file in the memory card (S302). Thereafter, the DCP 507 captures an image (S304). That is, the DCP 507 receives image data from the CDS-ADC 501.

Figure 7:
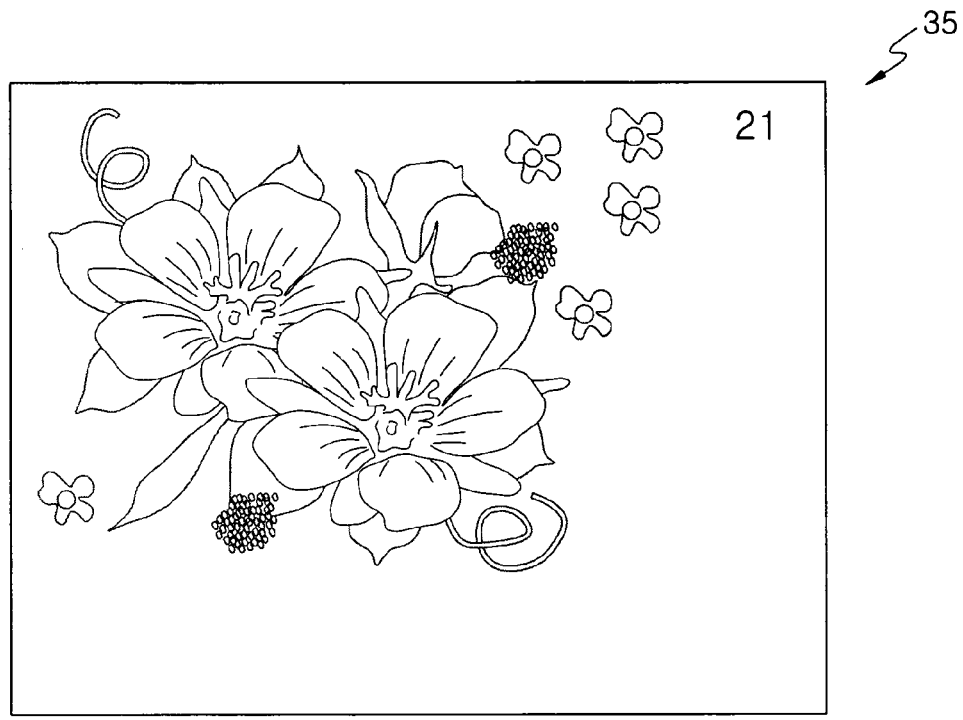
FIG. 7 is an exemplary view of a standard size image being displayed on a color liquid crystal display (LCD) panel of FIG. 1.

Next, the DCP 507 displays an image of the received image data on the color LCD panel 35 for few seconds (S306) (see FIG. 7).

Figure 8:
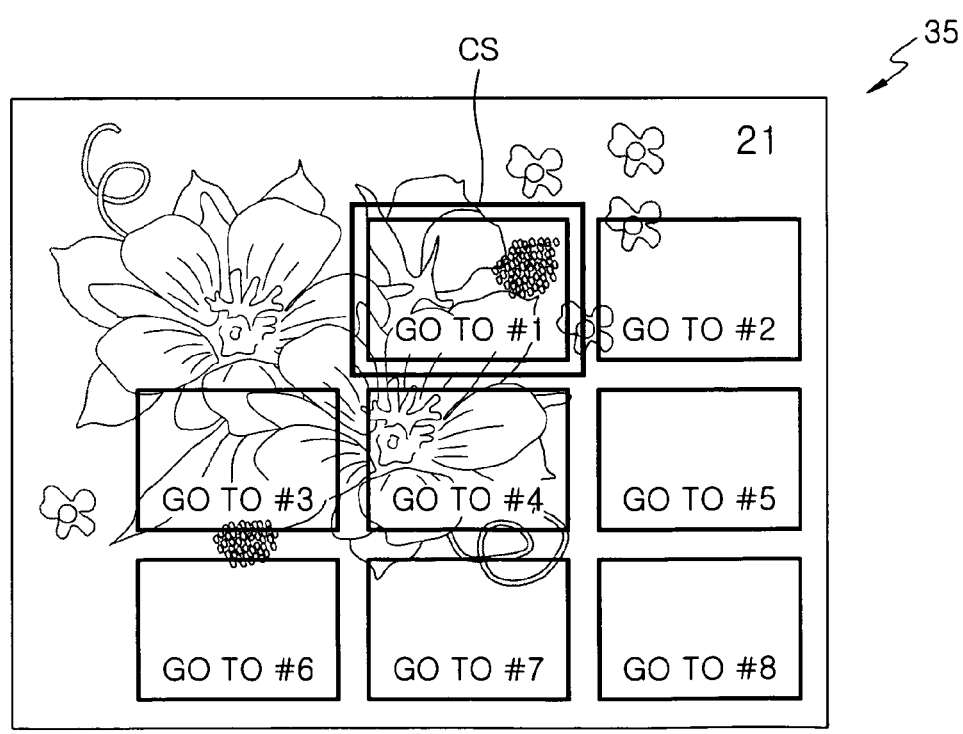
FIG. 8 shows the view of FIG. 7, further showing a go to list superimposed on the standard size image.
Figure 9:
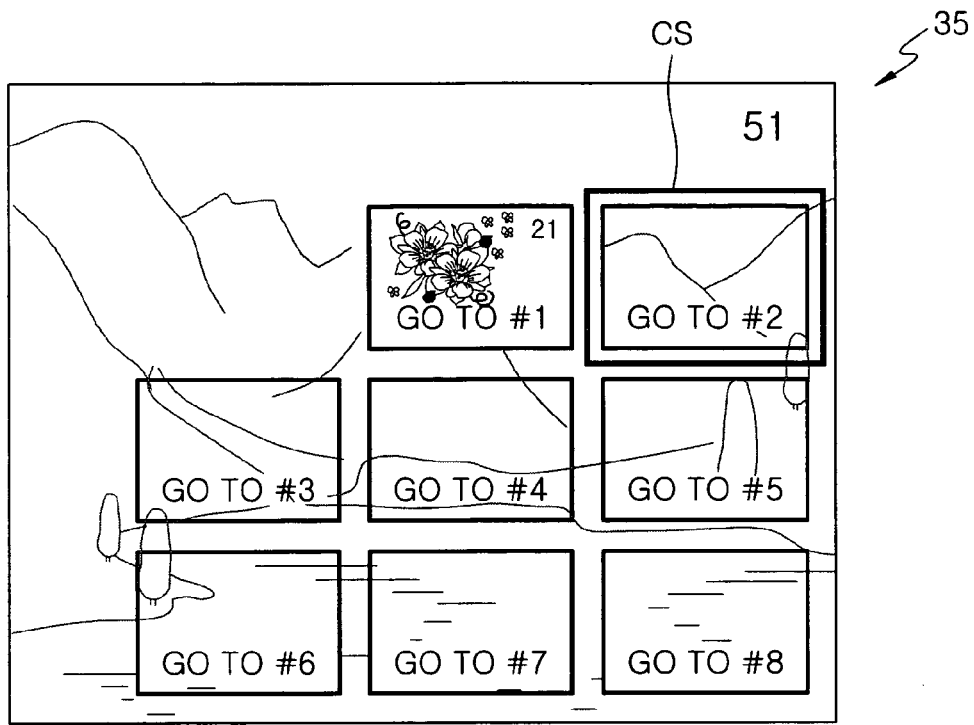
FIG. 9 shows an exemplary view of another standard size image being displayed on the LCD panel of FIG. 1 after setting the standard size image of FIGS. 7 and 8 in the superimposed go to list.
Figure 11:
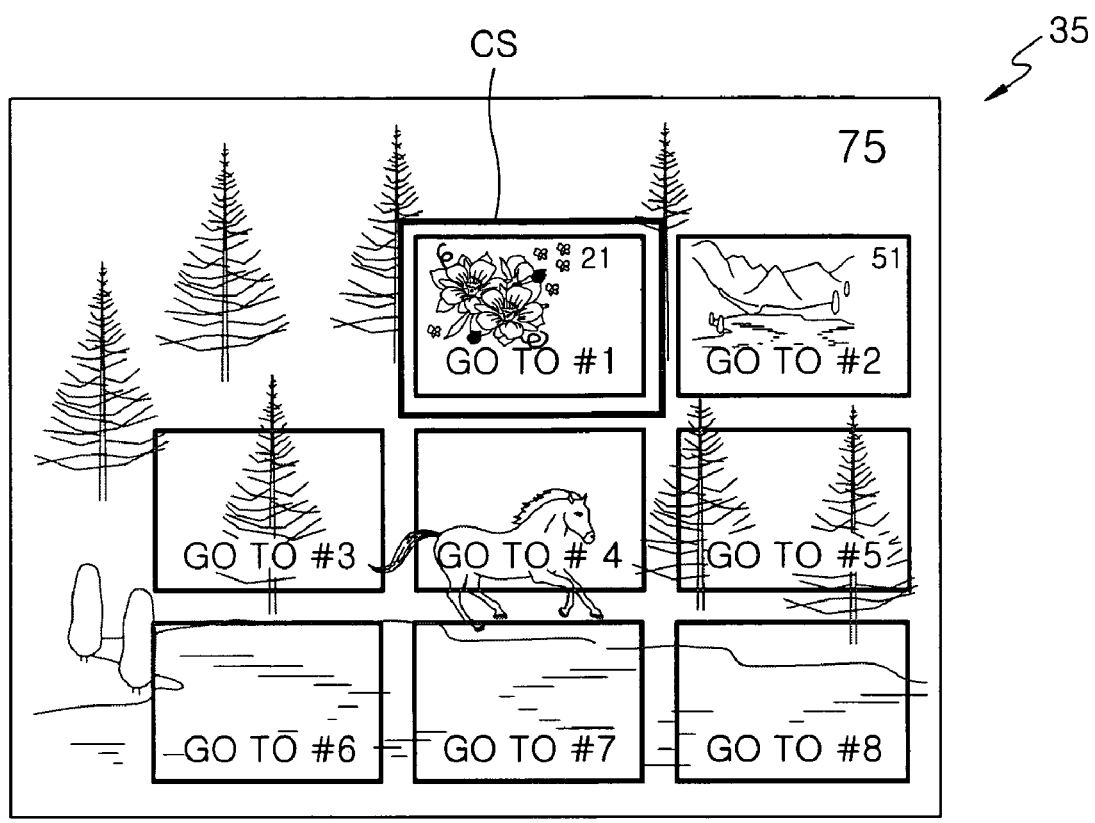
FIG. 11 shows the view of FIG. 10, further showing a go to list superimposed on the standard size image with the go to list including reduced size images of the full size images of FIGS. 7 and 9.

Then, when a go to signal is input via user input unit INP by the user, for example, by pressing the menu/select-confirm button located at the center of the function buttons 15 for a set time (S308), the DCP 507 performs the following operations:

First, in step S310, the DCP 507 displays a go to list, for example, as shown in FIGS. 8, 9 and 11, composed of a plurality of blocks or frames that are configured to display a thumbnail-sized image. In the case of the go to list shown in FIG. 8, none of the go to blocks are set with an image and a number set by a go to setting. In the case of the go to list shown in FIG. 9, a go to block #1" is set by the go to setting, and includes a thumbnail image of an image file corresponding to standard size image 21 of FIG. 7.

Next, when a direction button signal is input to the DCP 507 by the user, for example, by pressing the self-timer/right button, the flash/left button, the macro/down button, or the audio-memo/up button, the DCP 507 moves an activated cursor CS (see FIGS. 8 and 9) on the go to list blocks according to the input direction button signal (S312 and S314). The operations S312 and S314 are repeated until a confirm signal is input by the user, for example, by pressing the menu/select-confirm button located at the center among the function buttons 15 (S316).

Then, when the confirm signal is input to the DCP 507, the DCP 507 performs the go to function relative to the currently displayed image (S318). As will be described hereafter in more detail, the DCP 507 stores a go to number of the selected block in an image file EXIF header D3 (see FIG. 13) in a tag information data segment M2 (see FIG. 12) of the image file generated in operation S302. Therefore, in the displaying of the go to list (S310), the DCP 507 searches only the image file EXIF header D3 of each of the images and quickly obtains go to setting information.

Next, in step S320, the DCP 507 compresses the received image data, and then in step S322 stores the compressed image data in an image file generated in step S302.

When the go to signal is not input to the DCP 507 in operation S308, the DCP 507 performs only operations S320 and S322.

Figure 4:
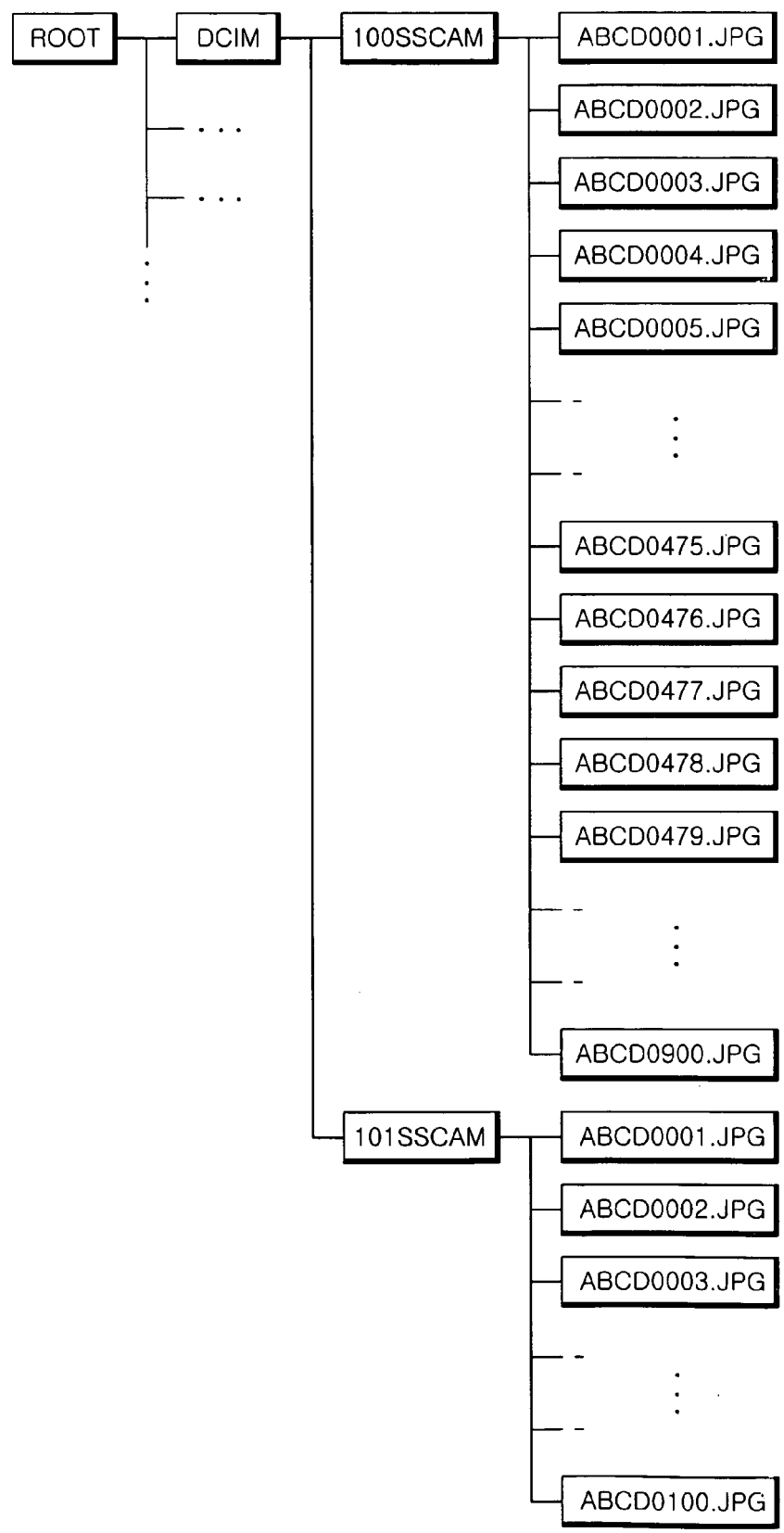
FIG. 4 is a diagram illustrating organization of stored files in a memory card when performing the photographing mode mentioned in FIG. 3.

FIG. 4 is a block diagram illustrating an example organization of files stored in the memory card by performing the photographing mode mentioned in FIG. 3.

Referring to FIG. 4, a folder DCIM in which user's data files are to be stored is formed under a top-level folder ROOT generated by formatting the memory card.

First and second folders 100SSCAM and 101SSCAM are generated under the folder DCIM to store files generated by the user's photographing operations. The name of the first folder 100SSCAM is composed of a folder index 100 and a code SSCAM. Similarly, the name of the second folder 101SSCAM is composed of a next folder index 101 and the same code SSCAM.

The code SSCAM is arbitrarily set during a manufacturing process of the digital image processing apparatus such as the digital camera 1. 900 image files are stored in the order in which they are generated in the first folder 100SSCAM, and 100 image files are stored in the order in which they are generated in the second folder 101SSCAM, but each folder may include fewer or additional files.

A code ABCD and a file index number that is incremented in the order in which the files are generated make up a file name. For example, a first file ABCD0001.JPG in the first folder 100SSCAM is the first file to be generated, and ABCD0900.JPG in the first folder 100SSCAM is the last file to be generated in the first folder 100SSCAM. Similarly, ABCD0001.JPG is the first file in the second folder 101SSCAM, and a $100^{th}$ file ABCD0100.JPG in the second folder 101SSCAM is the most recently generated file. Thus, image files may have the same file name such that they are distinguishable as being located in different folders. One can appreciate that the go to setting can help users distinguish between files having the same name.

Figure 5:
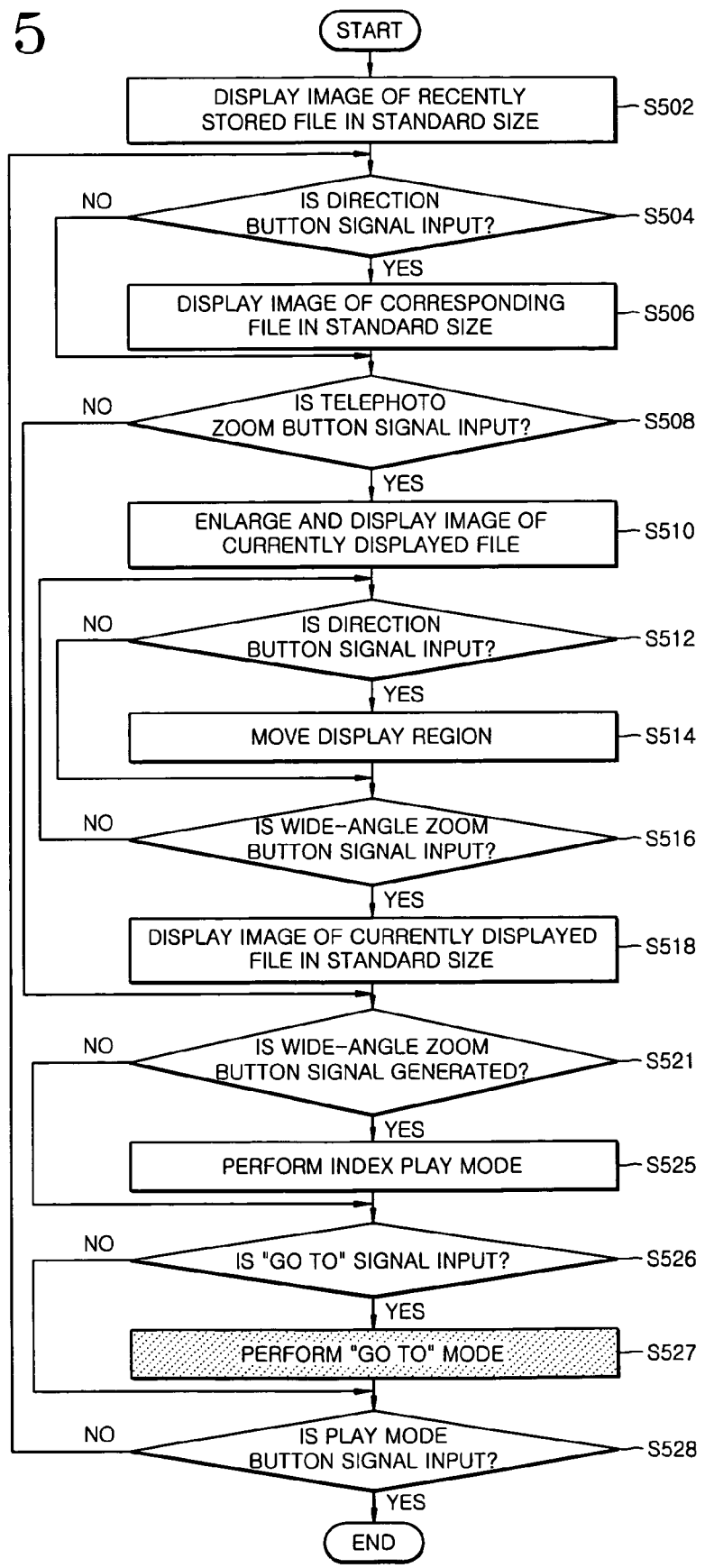
FIG. 5 is a flow chart illustrating an algorithm performed in a play mode of a DCP illustrated in FIG. 2.

FIG. 5 is a flow chart illustrating the algorithm performed in the play mode of the DCP 507 illustrated in FIG. 2. The play mode is performed when the play mode button 42 is pressed during the preview or photographing mode. Referring to FIGS. 1, 2, and 5, the algorithm performed in the play mode will be described.

Figure 10:
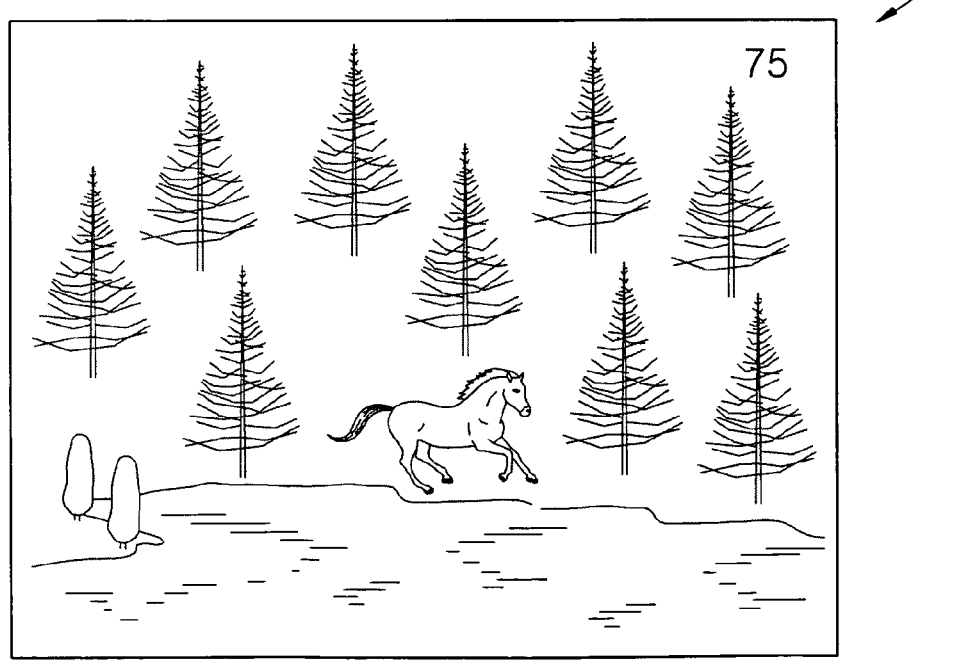
FIG. 10 is an exemplary view of yet another standard size image being displayed on the LCD panel of FIG. 1 after displaying an image of a recently stored file.

First, in the play mode the DCP 507 controls the LCD driving unit 514 and displays an image of the file most recently stored in the memory card on the color LCD panel 35 in a standard size (S502) (see FIG. 7 or 10). The standard size denotes a size of an image displayed over an entire display region of the color LCD panel 35 as opposed to a thumbnail or reduced size image that is used in the go to list.

Then, in step S504 when a direction signal is generated, for example, by the user pressing the self-timer/right button, the flash/left button, the macro/down button, or the audio-memo/top button included in the function buttons 15, the DCP 507 controls the LCD driving unit 514 and displays an image from image data in a file corresponding to the generated direction signal in the standard size on the color LCD panel 35 (S506).

Next, in step S508 when a telephoto zoom button signal is generated by the user by pressing the telephoto zoom button $39_T$, the DCP 507 controls the LCD driving unit 514 and enlarges an image of the currently displayed file (in standard size) and displays the same file as an enlarged image on the color LCD panel 35 (S510).

When a direction signal is generated, for example, by the user by pressing the self-timer/right button, the flash/left button, the macro/down button, or the audio-memo/top button included in the function buttons 15 while the enlarged image is displayed (S512), the DCP 507 controls the LCD driving unit 514 and moves a display region of the enlarged image according to the generated direction signal (S514).

When a wide-angle zoom button signal is generated by the user by pressing the wide-angle zoom button $39_W$ while the enlarged image is displayed (S516), the DCP 507 controls the LCD driving unit 514 and displays the image of the currently displayed file in the standard size on the color LCD panel 35 (S518) (see FIG. 7 or 10).

When the user generates a wide-angle zoom button signal while the image is being displayed in the standard size (S521), the DCP 507 performs an index-play mode (S525). In the index-play mode, a plurality of thumbnail images are displayed on the screen so that when a user selects a thumbnail image, it is displayed in the standard size.

Thereafter in step S526, when a go to signal is generated by the user, for example by pressing the menu/select-confirm button located at the center of the function buttons 15 for a few seconds, the DCP 507 performs a go to mode (S527). The performing of the go to mode (S527) will be described in more detail hereafter with reference to FIGS. 6 and 11.

Operations S504 through S527 are repeatedly performed until the user presses the play mode button 42. When the play mode button 42 is pressed, the play mode ends and the digital camera 1 switches to the preview or photographing mode (S528).

Figure 6:
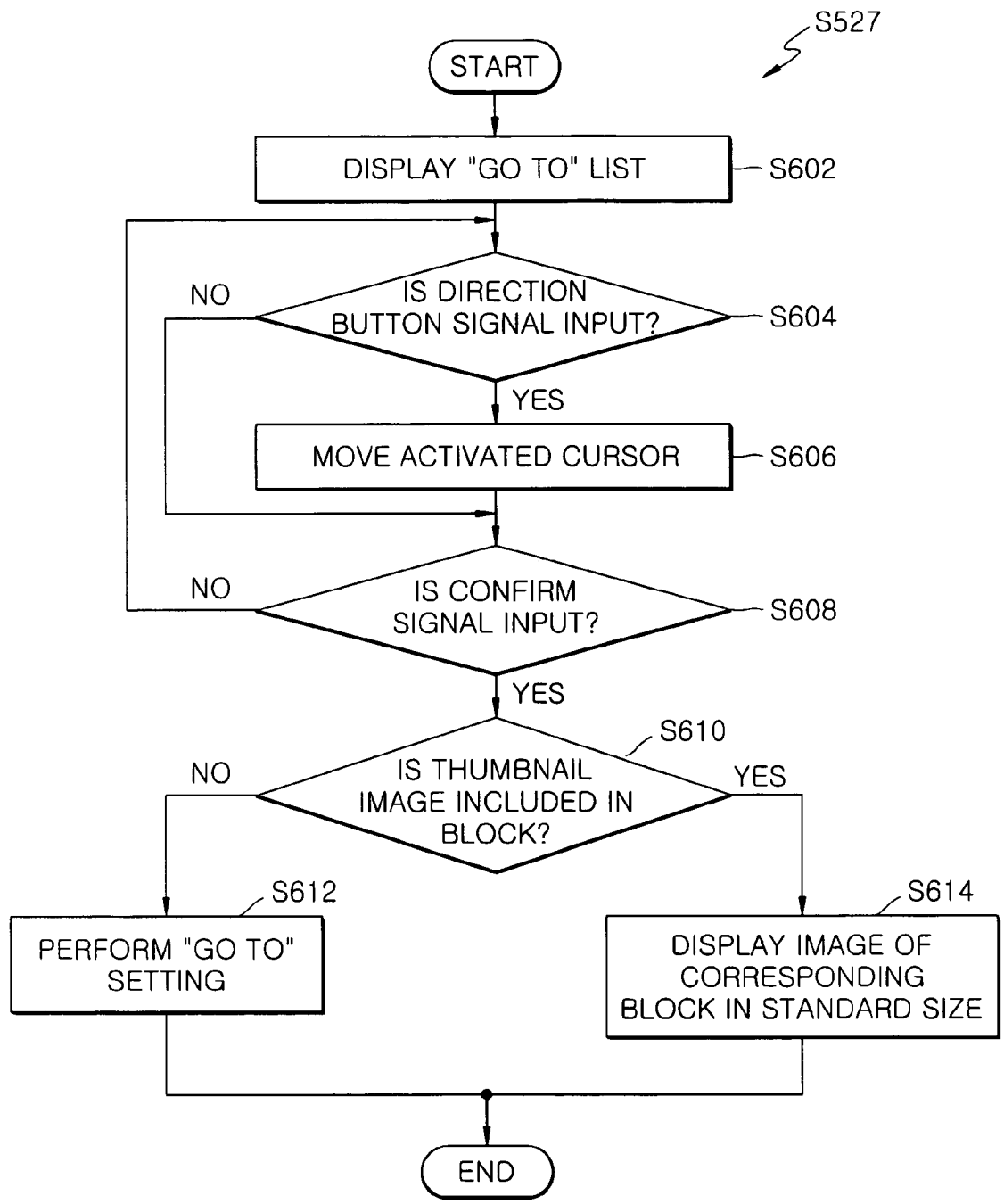
FIG. 6 is a flow chart illustrating an algorithm performed in a go to mode described in FIG. 5.

FIG. 6 is a flow chart illustrating an algorithm performed in the go to mode (S527) described in FIG. 5. Referring to FIGS. 6 and 11, the algorithm performed in the go to mode (S527) described in FIG. 5 is as follows.

First, the DCP 507 controls the LCD driving unit 514 and displays a go to list, for example, including a plurality of blocks (S602) (see FIG. 11). In the case of the go to list illustrated in FIG. 11, go to blocks numbered 1 and 2 are used so that thumbnail images of image files corresponding to the go to numbers 1 and 2 are displayed in the blocks.

Then, when a direction button signal is input to the DCP 507 by the user, for example, by pressing the function buttons 15 (e.g., the self-timer/right button, the flash/left button, the macro/down button, or the audio-memo/top button) (S604), the DCP 507 moves an activated cursor CS (FIGS. 8, 9, 11) of the go to list according to the input direction button signal (S606). Operations S604 and S606 are repeated until the confirm signal is input, for example, when the user presses the menu/select-confirm button (S608).

Thereafter, the DCP 507 determines whether a thumbnail image is already included in or assigned to the currently activated block (S610). That is, the DCP 507 determines whether an image has been marked by a user via the go to setting to have a go to number assigned thereto.

When a thumbnail image is not included in the currently activated block in operation S610, the DCP 507 performs a go to setting for the currently displayed image (S612). In more detail, the DCP 507 writes or stores a go to number of the selected block in an image file EXIF header D3 (see FIG. 13) of a tag information data segment M2 (see FIG. 12). Therefore, in the displaying of the go to list (S602), the DCP 507 searches only the image file EXIF header D3 of each of the images to quickly retrieve and display images that were identified, marked, flagged, bookmarked or the like via the go to setting.

When the thumbnail image is included in the currently activated block in operation S610, the DCP 507 controls the LCD driving unit 514 and displays an image that is set with a go to setting that corresponds to the go to number (#1 in the case illustrated FIG. 11) of the currently activated block in the standard size (S614). For example, when a "go to #1" block is selected as illustrated in FIG. 11, the screen illustrated in FIG. 7 is displayed.

As such, an image selected by the user among the images that are set with the go to setting can be immediately displayed. Accordingly, the user can quickly and easily find a desired image using the images that are set in the go to setting.

Figure 12:
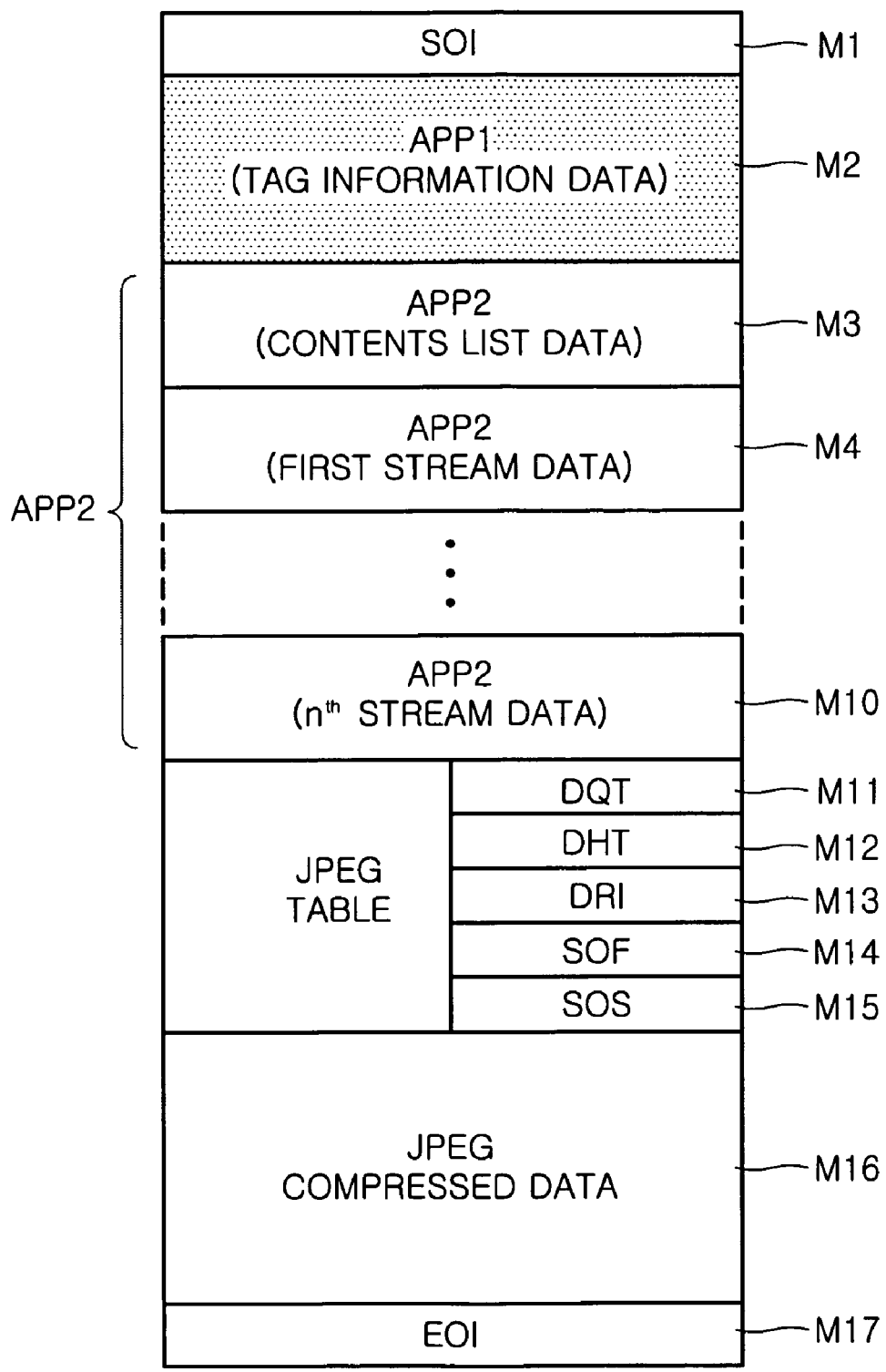
FIG. 12 illustrates a structure for image files that are stored in the memory card.

FIG. 12 illustrates an example data structure of the image files stored in the memory card as the photographing mode described in FIG. 3 is performed. The structure of the image file in FIG. 12 uses an EXIF (Exchangeable Image File) format, which follows a standard image format of a digital camera described in ISO 12,234-1. Referring now to FIG. 12, the structure of the image file stored in the memory card by performing the photographing mode will be described.

First, there exists a segment M1 which stores data notifying the start of an image (SOI). Below segment M1 are application segments M2 through M10.

Tag information data, which is basic information of the image file, is stored in the first application segment M2. The go to number of the selected block in the go to setting operations (S318 of FIG. 3 and S612 of FIG. 6) is stored in the image file EXIF header D3 (see FIG. 13) of the tag information data M2.

Contents list data M3, first stream data M4 through $n^{th}$ stream data M10 are stored in the second application segment APP2. A JPEG table that is segmented as M11 through M15 below the second application segment APP2 includes a define quantization tables (DQT) segment M11, a define Huffman tables (DHT) segment M12, a define restart interval (DRI) segment, a discrete cosine transform frame (SOF) segment M14, and a start of scan (SOS) segment M15. JPEG compression data segment M16 exists below the JPEG table segment. Lastly, a data storage segment M17 that notifies the end of image (EOI) exists.

Figure 13:
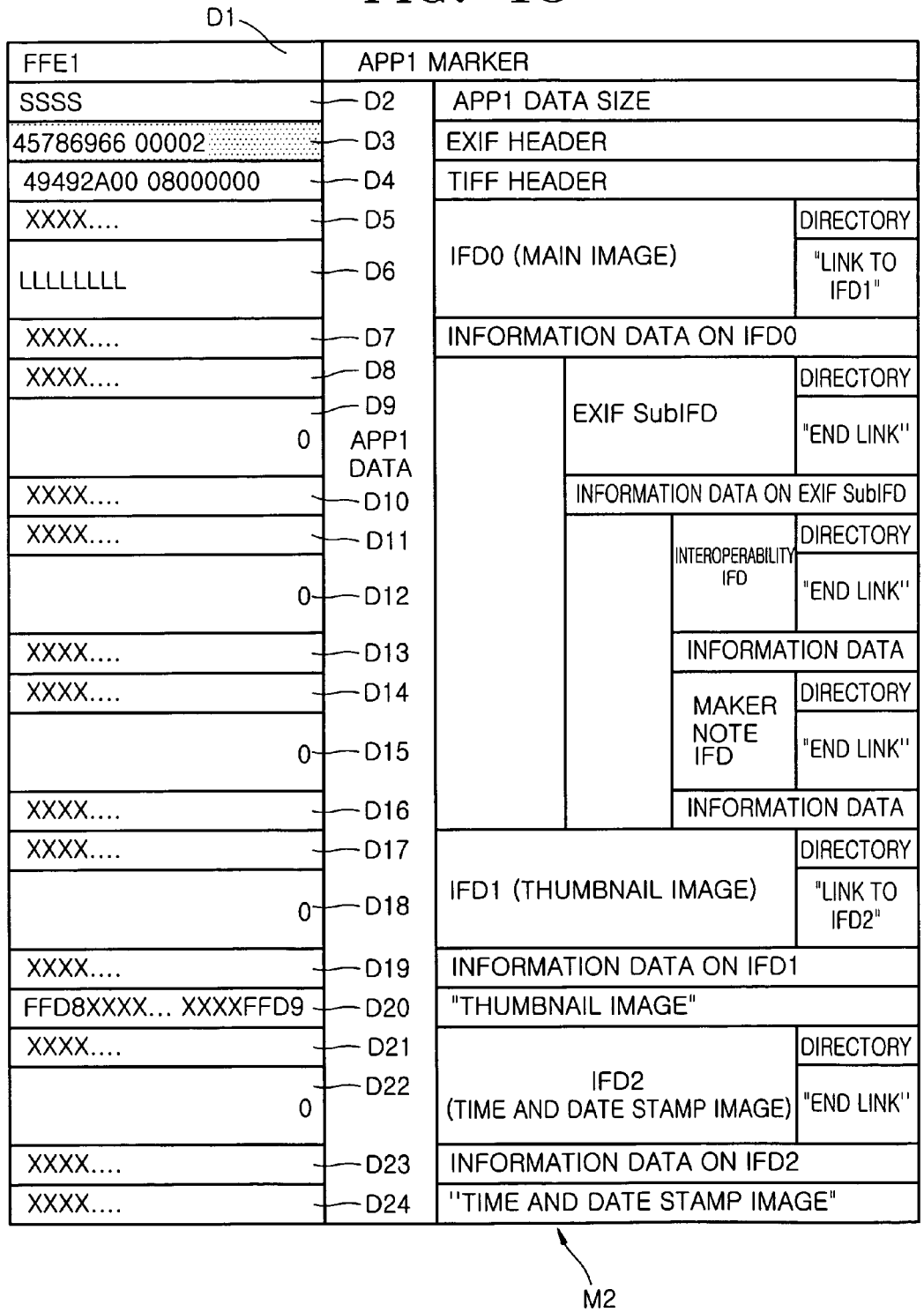
FIG. 13 is a diagram illustrating the structure of a tag information data segment in the image file illustrated in FIG. 12.

Referring to FIGS. 12 and 13, the structure of the tag information data segment M2 (APP1) of the image file will be described.

First, there exists a marker D1 of the first application segment APP1, a data size D2 of the first application segment APP1, the header D3 of the image file EXIF, and a tag image file format (TIFF) header D4. Then, there exists an image file directory (IFD) 0 segment D5 through D16, an IFD1 segment D17 through D20, and an IFD2 segment D21 through 24.

In the image file EXIF header D3 of the tag information data segment M2, the final one byte denotes a go to number of the block selected in the go to setting operations (S318 of FIG. 3 and S612 of FIG. 6). For example, when the final byte of the image file EXIF header D3 is 2 as illustrated in FIG. 13, a "go to #2" is set by a go to setting for an image of the corresponding file. When the final byte of the image file EXIF header D3 is "F," a "go to #15" is set as a go to setting for an image of the corresponding file. When the final byte of the image file EXIF header D3 is "0 (zero)," a go to setting is not set to an image of the corresponding file.

Therefore, the setting information can be quickly obtained by the DCP 507 searching only the final byte of the image file EXIF header D3 for each of the images. If the final two bytes are used to denote a go to number, more images can be set with a go to setting.

The IFD0 segment includes a directory D5 of a main image, link data D6 of the main image, location data D7 of the main data, a directory D8 of a sub-image, link data D9 of the sub-image, location data D10 of the sub-image, directory D11 of interoperability information, link data D12 of the interoperability, data D13 of the interoperability information, a directory D14 of a manufacturing company information, link data D15 of the manufacturing company information, and data D16 of the manufacturing company information.

The IFD1 segment includes a directory D17 of a thumbnail image regarding the main image, link data D18 of the thumbnail image, information data D19 of the thumbnail image, and data D20 of the thumbnail image.

Information of an image of a time and date stamp that is compressed and stored in the JPEG compression data segment M16 is stored in the IFD2 segment. That is, the IFD2 segment includes a directory D21 of a time and date stamp image, link data D22 of the time and date stamp image, information data D23 of the time and date stamp image, and data D24 of the time and date stamp image.

As described above, an image selected by a user among images in which a go to setting is set can be immediately displayed according to the method of controlling the digital processing apparatus. As a result, the user can quickly and conveniently search a desired image using the images that are set in the go to setting.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a digital photographing apparatus, the method comprising:
   detecting a first signal for establishing a go to setting;
   displaying on a screen a go to list including a plurality of go to items, each having a go to number;
   detecting a second signal for selecting a go to item of the plurality;
   determining if the selected go to item relative to the second signal is associated with an image file stored in a recording medium; and
   according to the determining step, associating a go to number with a currently displayed image on the screen when the selected go to item is not associated with an image file stored in the recording medium, or reproducing an image relative to the image file stored in the recording medium.

2. The method of claim 1 wherein the associating step further comprises adding the displayed image to the go to list.

3. The method of claim 1 wherein the associating step comprises marking the displayed image on the screen with a go to number.

4. The method of claim 3 wherein the marking step comprises writing the go to number to a tag information data segment of an image file, the image file storing image data of the displayed image on the screen.

5. The method of claim 4 wherein the writing step comprises appending the go to number to an Exchangeable Image File format header of the tag information data segment.

6. The method of claim 5 wherein the displaying step comprises:
   reproducing a plurality of thumbnail-sized frames on the screen;
   identifying image files in the recording medium having Exchangeable Image File format headers appended with a go to number; and
   relative to the identifying step, generating thumbnail-sized images from the image files in the frames.

7. The method of claim 1 wherein the displaying step comprises superimposing the go to list over a recently-captured standard size image that is displayed on the screen.

8. The method of claim 7 wherein the reproducing step comprises replacing the recently-captured standard size image on the screen with a standard size image relative to the image file stored in the recording medium.

9. A method for retrieving select images from a plurality of image files stored in a recording medium of a digital photographing apparatus, the method comprising:
   capturing an image;
   displaying the image in a standard size on a screen;
   detecting a first signal for displaying on the screen a plurality of thumbnail-sized frames;
   detecting a second signal for selecting a frame of the plurality;

determining if the selected frame relative to the second signal includes an image while maintaining the currently displayed image in the standard size on the screen; and if the frame is empty according to the determining step, reproducing the currently displayed image in the selected frame while maintaining the currently displayed image in the standard size on the screen.

10. The method of claim 9 wherein the reproducing step comprises writing a go to number associated with the selected frame to a tag information data segment of an image file for the image.

11. The method of claim 10 wherein the writing step comprises appending the go to number to an Exchangeable Image File format header of the tag information data segment.

12. The method of claim 11 wherein the step of displaying on the screen a plurality of thumbnail-sized frames further comprises:

reproducing a plurality of empty thumbnail-sized frames on the screen;

identifying image files in the recording medium having Exchangeable Image File format headers appended with a go to number; and relative to the identifying step, generating thumbnail-sized images from the image files in the empty frames.

13. The method of claim 9 wherein the step of displaying on the screen a plurality of thumbnail-sized frames comprises superimposing the frames on the standard size image that is being displayed on the screen.

14. A digital image processing apparatus comprising:

an optical system for receiving a light reflected from a subject;

a photoelectric conversion module in optical communication with the optical system for converting the light to image data;

a recording medium for storing the image data in an image file;

a display screen; and a controller connected with the photoelectric conversion module, the recording medium and the display screen, the controller processing and storing the image data in a photographing mode and, displaying an image of the subject relative to the image data in a stored-image display mode, wherein the controller in the photographing mode detects a go to setting signal, displays a go to list on the display screen relative to the go to setting signal, detects a second signal for selecting a go to item of the go to list, determines if the selected go to item relative to the second signal is associated with an image file stored in the recording medium while displaying the image of the subject relative to the image data, and according to the determining step, associates a go to number of the selected go to item with the currently displayed image on the screen.

15. The digital image processing apparatus of claim 14 wherein the go to list comprises a plurality of thumbnail-sized frames.

16. The digital image processing apparatus of claim 14 wherein the controller comprises at least one of a digital camera processor and a microcontroller.

17. The digital image processing apparatus of claim 14 further comprising a user input including a go to setting actuator for providing the go to setting signal to the controller.

18. The digital image processing apparatus of claim 17 wherein the user input comprises at least one directional actuator including a confirm button, the confirm button generating the go to actuation signal when depressed for a predetermined duration.

19. The digital image processing apparatus of claim 14 wherein the controller writes a go to number associated with the selected go to item to a tag information data segment of an image file in the recording medium.

20. The digital image processing apparatus of claim 19 wherein the controller appends the go to number to an Exchangeable Image File format header of the tag information data segment.

21. A method for controlling a digital photographing apparatus, the method comprising:

detecting a first signal for establishing a go to setting;

displaying on a screen a go to list including a plurality of go to items, each having a go to number;

detecting a second signal for selecting a go to item of the plurality;

determining if the selected go to item relative to the second signal is associated with an image file stored in a recording medium; and according to the determining step, associating a go to number with a currently displayed image on the screen, wherein the associating step comprises writing the go to number to a tag information data segment of an image file which is different from a TIFF unit of the image file, the image file storing image data of the displayed image on the screen.

* * * * *